US010873723B2

(12) United States Patent
Gottlieb

(10) Patent No.: US 10,873,723 B2
(45) Date of Patent: Dec. 22, 2020

(54) SYSTEM AND METHOD FOR FACILITATING CONSUMER ENGAGEMENT THROUGH A VIDEO COMMUNICATION NETWORK

(71) Applicant: Adam Gottlieb, Sydney Markets (AU)

(72) Inventor: Adam Gottlieb, Sydney Markets (AU)

(*) Notice: Subject to any disclaimer, the term of this patent is extended or adjusted under 35 U.S.C. 154(b) by 0 days.

(21) Appl. No.: 16/496,310

(22) PCT Filed: Mar. 22, 2018

(86) PCT No.: PCT/AU2018/050263
§ 371 (c)(1),
(2) Date: Sep. 20, 2019

(87) PCT Pub. No.: WO2018/170550
PCT Pub. Date: Sep. 27, 2018

(65) Prior Publication Data
US 2020/0275054 A1 Aug. 27, 2020

(30) Foreign Application Priority Data
Mar. 23, 2017 (AU) ................ 2017901041

(51) Int. Cl.
*H04N 7/14* (2006.01)
*G06F 3/147* (2006.01)
(Continued)

(52) U.S. Cl.
CPC ........... *H04N 7/147* (2013.01); *G06F 3/0482* (2013.01); *G06F 3/04886* (2013.01);
(Continued)

(58) Field of Classification Search
CPC .......... H04N 7/14; H04N 7/08; H04N 21/488; H04N 21/44; G06F 3/147; G06F 3/0488;
(Continued)

(56) References Cited

U.S. PATENT DOCUMENTS 6,941,575 B2  9/2005 Allen
2009/0287534 A1  11/2009 Guo et al.
(Continued)

FOREIGN PATENT DOCUMENTS

EP          2 958 071 A1   12/2015
WO    WO 2008/084406 A2    7/2008
WO       WO-2008084406 A2 *  7/2008 ............. G06Q 30/02

OTHER PUBLICATIONS

International Search Report for International Application No. PCT/AU2018/050263, dated May 25, 2018, 5pp.
(Continued)

*Primary Examiner* — Melur Ramakrishnaiah
(74) *Attorney, Agent, or Firm* — Lewis Roca Rothgerber Christie LLP

(57) ABSTRACT

A computer network for facilitating engagement between consumers present at a premises and agents is disclosed. The network comprises touchscreen computers with cameras and configured to communicate with an agent computer and send a continuous uplink video stream to the agent computer. Activation of a button sends a notification to the agent computer comprising a camera and configured to continuously and simultaneously display multiple uplink video streams from the touchscreen computers and receive the notification of activation. The agent computer displays a graphical indication of the notification of activation associated with the video stream received from that touchscreen computer and detection of a selection captures a video stream by the camera of the agent computer and establishes a video channel with the touchscreen computer to send the captured video stream as a downlink video stream from the agent computer to that selected touchscreen computer.

19 Claims, 10 Drawing Sheets

(51) Int. Cl.
  *G06F 3/0488* (2013.01)
  *G06F 3/0482* (2013.01)
  *G06K 9/00* (2006.01)
  *H04N 21/488* (2011.01)
  *H04L 29/12* (2006.01)
  *H04N 21/44* (2011.01)
  *G06Q 30/00* (2012.01)
  *G06Q 20/18* (2012.01)
  *H04N 7/08* (2006.01)

(52) U.S. Cl.
  CPC ......... *G06F 3/147* (2013.01); *G06K 9/00228* (2013.01); *G06Q 20/18* (2013.01); *G06Q 30/016* (2013.01); *H04L 61/20* (2013.01); *H04N 7/0806* (2013.01); *H04N 21/44* (2013.01); *H04N 21/4882* (2013.01); *H04L 61/6022* (2013.01)

(58) Field of Classification Search
  CPC ........ G06F 3/0482; G06K 9/00; G06Q 30/00; G06Q 20/18
  USPC ................ 348/14.01–14.16; 705/26.41, 7.34
  See application file for complete search history.

(56) References Cited

U.S. PATENT DOCUMENTS

| | | | |
|---|---|---|---|
| 2015/0310377 A1* | 10/2015 | Schlumberger | G06Q 10/063114 705/7.15 |
| 2016/0180423 A1* | 6/2016 | Defoy | G06Q 30/0613 705/7.26 |
| 2018/0241930 A1* | 8/2018 | Eisses | H04N 5/272 |

OTHER PUBLICATIONS

Written Opinion for International Application No. PCT/AU2018/050263, dated May 25, 2018, 6pp.

* cited by examiner

SYSTEM AND METHOD FOR FACILITATING CONSUMER ENGAGEMENT THROUGH A VIDEO COMMUNICATION NETWORK

CROSS-REFERENCE TO RELATED APPLICATIONS

This application is a National Phase Patent Application of International Patent Application Number PCT/AU2018/050263, filed on Mar. 22, 2018, which claims priority of Australian Provisional Patent Application No 2017901041 filed on Mar. 23, 2017. The entire contents of both of which are incorporated herein by reference.

TECHNICAL FIELD

This disclosure relates to computer systems and methods for facilitating consumer engagement through a video communication network. In particular, the disclosure relates to providing on demand assistance to consumers leveraging technology such as video streaming and touchscreen computers.

BACKGROUND

Brick and mortar retailers have lost significant numbers of consumers to online retailers in the past few years. One reason is that online retailers have the technology available that provides increased service levels compared to brick and mortar retailers. In particular, consumers using online stores can find answers to most questions immediately either through searchable online resources, such as frequently asked questions, automatic chat bots or online chats with service staff.

This online shopping technology is not directly applicable to brick and mortar retailers where consumers roam the store in person. As a result of this technology gap, it is often difficult for brick and mortar retailers to engage consumers that are physically present in retailer's premises.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

The present disclosure refers to a computer network for facilitating engagement between consumers present at a premises and agents. The computer network further comprises a plurality of touchscreen computers installed on the premises comprising cameras, wherein the touchscreen computers are configured to communicate with an agent computer and send a continuous uplink video stream to the agent computer;

display a button on an idle screen;

detect an activation of the button by one or more consumers; in response to detecting the activation of the button, send a notification to the agent computer;

the agent computer comprising a camera is configured to:

continuously and simultaneously display multiple uplink video streams from the touchscreen computers;

receive the notification of activation generated by the touchscreen computers;

display a graphical indication of the notification of activation from one of the touchscreen computers, the graphical indication being associated with the video stream received from that touchscreen computer;

detect selection of one of the video streams on the agent computer by the agent, in response to detection of the selection, capture a video stream by the camera of the agent computer and establish a video channel with the touchscreen computer to send the captured video stream as a downlink video stream from the agent computer to that selected touchscreen computer; and wherein the touchscreen computer is configured to switch from the idle screen to a video display mode to display the downlink video stream received from the agent computer.

It is a technical advantage that the continuous uplink video stream allows the agent to see what is currently in front of all the touchscreen computers. The consumers, however, can only see the idle screen until they select the button on the touchscreen computers. Advantageously, this button triggers a notification to the agent. It is another technical advantage that the agent can then see which tablet has been activated by the consumer and the display of the notification allows the agent to activate the downlink video stream. An even further technical advantage is that a single 'tap' instantly connects the consumer to the agent. This allows for more convenient engagement even when compared to online retailers where the requested information is often hidden within complex menu structures.

The agent computer may be further configured to:

detect selection of a further one of the video streams on the agent computer by the agent, in response to detection of the selection, terminate the video channel and establish a further video channel with a further touchscreen computer to send the captured video stream as a downlink video stream from the agent computer to that further touchscreen computer; and wherein the touchscreen computer is configured to switch from the video display mode to the idle screen and the further touchscreen computer is configured switch from the idle screen to a video display mode to display the downlink video stream received from the agent computer.

The computer network enables the agent to serve multiple customers from a single location by providing an option of switching from one touchscreen device to another. The touchscreen devices in this case may be deployed at multiple locations. The agent may switch from one touchscreen device to another proactively or as and when consumers activate the button on a particular touchscreen device.

The multiple agents may be associated with multiple agent computers and each video uplink from the touchscreen computers devices is directed to one of the agent computers.

In some embodiments, the uplink video stream from a touchscreen computer may be directed to the agent computer based on a proximity of the touchscreen computer to the agent computer.

In some other embodiments, the computer network may be installed at a premises having multiple departments and wherein the network is configured to stream continuous uplink video streams from the touchscreen computers of a department to the agent computers of that department.

In some further embodiments, the agent computer may be configured to detect a movement of the consumer from one touchscreen computer to another touchscreen computer and accordingly terminates a current downlink stream and starts a new downlink stream to the touchscreen computer to which the consumer has moved.

In order to facilitate smooth transition of the video call, the agent computer may be configured to detect the movement of the consumer from one touchscreen computer to another by at least one of, analysing the continuous uplink data streams from the touchscreen computers, using at least one face detection algorithms and using at least one motion detection algorithm.

In some exemplary embodiments, the agent computer may be configured to use at least one face detection algorithm to notify the agent that the face of the consumer which was appearing in the uplink stream of the touchscreen computer has appeared in the uplink video stream of another touchscreen computer;

the agent computer may further redirect the downlink video stream to the other touchscreen computer with which the consumer has moved.

In some further embodiments, the agent computer may be further configured to route the uplink video channels to at least one remote devices based on at least one of a location of the consumer interaction device, type of the consumer interaction device and Media Access Control MAC address of the consumer interaction device.

In some cases, the agent computer is configured to host a database for routing the uplink video channel to at least one remote devices based on at least one of a location of the touchscreen computers, type of the touchscreen computer and MAC address of the touchscreen computers.

The agent computer may further be configured to terminate the downlink video channels based on a termination input received at the touchscreen computers.

In some exemplary embodiments, the agent computer continues to receive the continuous uplink video from the touchscreen computers after the termination of the downlink video channel.

In some embodiments, the server, the touchscreen computers and the agent computers are configured to communicate with one another using a wireless communication channel.

In some further embodiments, the touchscreen computers and the agent computers share at least one of a Wi-Fi network, a hotspot and a subnet for communicating with each other.

The computer network hosting the touchscreen computers and the tablet computers may comprise a Wi-Fi router configured to host routing tables to route the continuous uplink video streams from the touchscreen computers to one or more agent computers across a premises.

In a second aspect, a method for facilitating engagement between consumers and agents is provided. The method comprising:

sending a continuous stream of uplink video stream from touchscreen computers to one or more agent computers;

displaying a button on an idle screen of a touchscreen computer;

continuously display multiple uplink video streams from the touchscreen computers at the agent computers;

detecting an activation of a button displayed on a touchscreen computer by a consumer;

sending a notification to the agent computer that a button on the touchscreen computer is activated by the consumer;

receiving the notification of activation generated by the touchscreen computers;

displaying an indication of the notification of activation from one of the touchscreen computers associated with the video stream received from that touchscreen computer;

detecting selection of one of the video streams on the agent computer by the agent;

capturing a video stream and establish a video channel with the touchscreen computer, in response to detection of notification of activation, and sending the captured video stream as a downlink video stream from the agent computer to that selected touchscreen computer; and displaying the downlink video stream at the touchscreen computer by changing the mode of the touchscreen computer from idle to active.

The step of sending continuous stream of uplink video streams may further comprise:

streaming the uplink video from the touchscreen computer to the agent computer based on a proximity of the touchscreen computer to the agent computer;

streaming the uplink video from the touchscreen computer to the agent computer based on at least one of a location of the consumer interaction device, type of the consumer interaction device and MAC address of the consumer interaction device.

The step of sending the captured video stream as the downlink video stream from the agent computer to that selected touchscreen computer may further comprise:

detecting a movement of the consumer from one touchscreen computer to another touchscreen computer and accordingly terminating a current downlink stream and starting a new downlink stream to the touchscreen computer to which the consumer has selected.

In some cases, the step of detecting a movement of the consumer from one touchscreen computer to another may comprise analysing the continuous uplink data streams from the touchscreen computers, using face detection algorithms and using a motion detection algorithm.

An agent computer for facilitating engagement between consumers and agents comprises:

a camera;

a processor, a memory coupled with the processor, wherein the memory comprises processor executable instructions for:

continuously displaying multiple uplink video streams from the touchscreen computers;

receiving the notification of activation generated by the touchscreen computers;

displaying a graphical indication of the notification of activation from one of the touchscreen computers, the graphical indication being associated with the video stream received from that touchscreen computer;

detecting selection of one of the video streams on the agent computer by the agent;

in response to detection of notification of activation, capturing a video stream by the camera of the agent computer and establishing a video channel with the touchscreen computer to send the captured video stream as a downlink video stream from the agent computer to that selected touchscreen computer.

In some cases, the agent computer is configured to host a database to route the continuous uplink video streams from the touchscreen computers to one or more agent computers across a premises.

Optional features described of any aspect of method, computer readable medium or computer system, where appropriate, similarly apply to the other aspects also described here.

DESCRIPTION OF EMBODIMENTS

The embodiments described herein relate to a system for facilitating interaction between consumers and agents using a computer network, which is particularly applicable for consumers that are physically present at a retailers premises, such as a retailer's brick and mortar shop. Herein, consumers that are physically present at the premises interact with touchscreen computers to directly connect with agents who can resolve queries of the consumers. The consumer is provided with a live feed of the agent upon pressing a button displayed on a an idle screen of a touchscreen computer.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. In this sense, a consumer does not necessarily need to be a consumer of products or services offered by a merchant. In some examples, the consumers may be consumers of information or other offers. For example, the visitors of a trade show, exhibition, museum, festival or other event are considered consumers. The consumers may encompass all consumers that ultimately consume the service provided via the disclosed technology.

Figure 1:
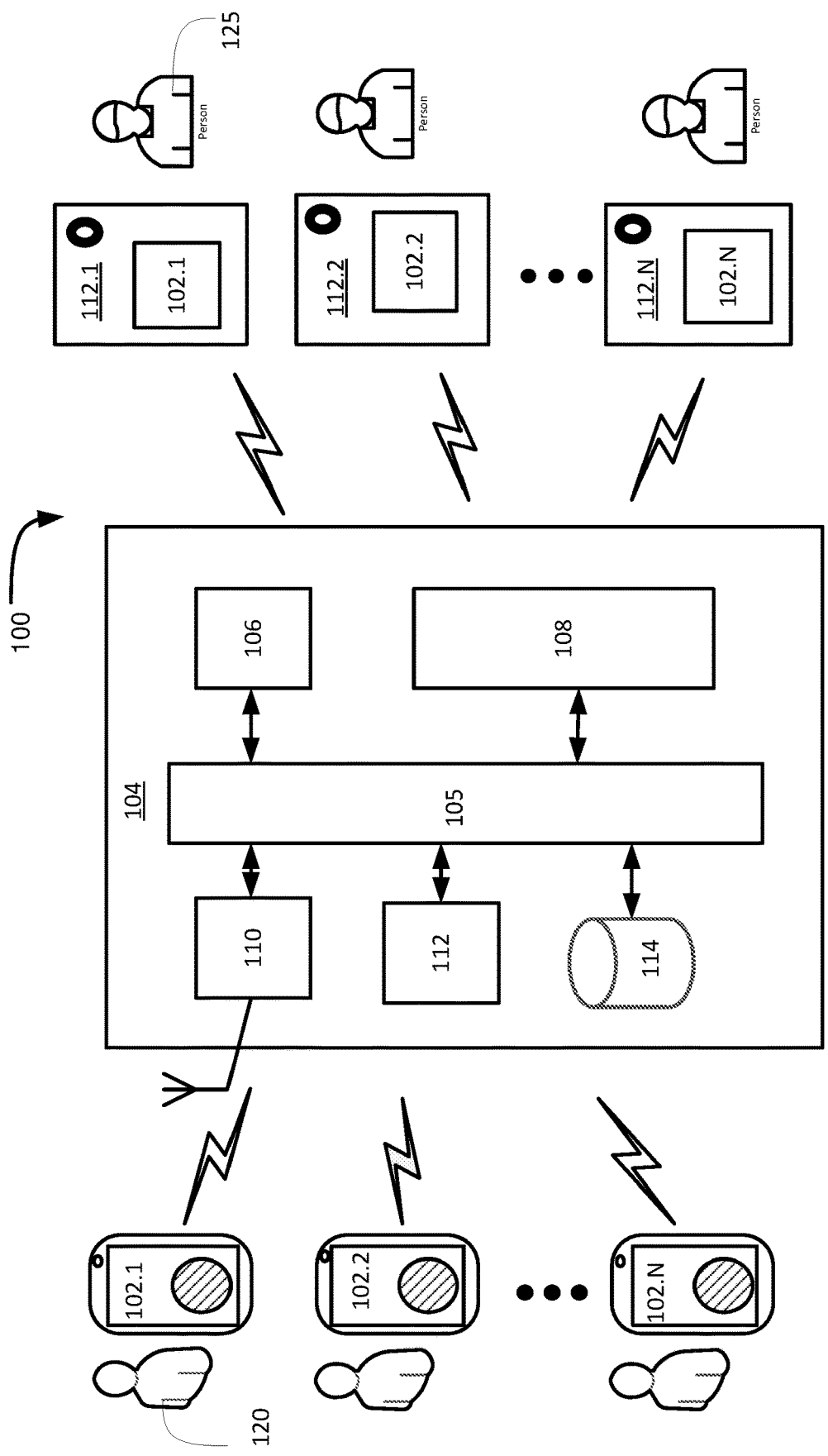
FIG. 1 illustrates a computer network for facilitating consumer engagement between multiple consumers and multiple agents.

FIG. 1 illustrates a computer network 100 for facilitating consumer engagement between multiple consumers 120 and multiple agents 125. The computer network 100 includes touchscreen computers 102.1-102.N, an agent computer 104 and agent computers 112.1-112.N. The aforementioned devices communicate with each other via a computer network such as a wired and a wireless network. In an example, the network may be provided by a single Wi-Fi Hotspot and/or the same subnet mask. In another example, the network may include multiple Wi-Fi Hotspots, service providers and geographical regions. Each of the touchscreen computers 102.1-102.N include a screen, a camera, a processor and a memory coupled to the processor which includes processor executable instructions for facilitating interaction with agents. The touchscreen computers may be tablet devices, such as Apple IPad, Samsung Galaxy, other iOS tablets, other Android tablets. In this instance, the software that controls the device to perform the methods disclosed herein may be an app that is installed through an app store or other app distribution platform. The touchscreen computers may also be other devices, such as PCs integrated into touchscreens or external to touchscreens.

Further, the touchscreen computer 102 includes a means for aiding the consumer 120 to establish a video channel with an agent at the tap of a button. In an embodiment, the means for aiding the consumer 120 to establish a video channel with an agent may include a user interface 202 to enable a consumer 120 to initiate a video communication channel with the agent. In an exemplary embodiment, the user interface may resemble a button 204 which includes the text TAP ME! displayed on the screen of the touchscreen computer. In a further embodiment, the touchscreen computer 102 may include a physical button which when activated establishes a video communication channel with the agents. Furthermore, the touchscreen computers include a camera 104 for capturing a live video stream of at least a portion of the consumer 120. Thereafter, the agent computer 104 receives an uplink video of the consumer 120 which is streamed by the touchscreen computer 102 via the network. The agent computer 104 may receive the uplink video stream which is captured from the camera associated with the touchscreen computer 102.

The agent computer 104 includes a processor 106, memory 108, a communication module 110, an I/O module 112 and a storage medium 114. The aforementioned components are connected to each other by a bus 105. In an embodiment, the agent computer 104 includes a screen 112 on which the uplink video stream is continuously displayed. In another variation, the agent computer 104 may feed uplink video streams from multiple touchscreen computers to multiple screens 112.1-112.N. The memory 108 of the agent computer 104 may include processor executable instructions which enable to the agent computer 104 to receive an uplink video stream, stream the uplink video to one or more screens 112.1-112.N, receive a downlink video from the screens 112.1-112.N and route the downlink video stream to an appropriate touchscreen computer 102.1-102.N. The communication module 110 may connect to a wired or a wireless internet connection using standard protocols. In an exemplary embodiment, each of the screens 112.1-112.N may be associated with a separate agent computer, such as agent computer 104.

Figure 2:
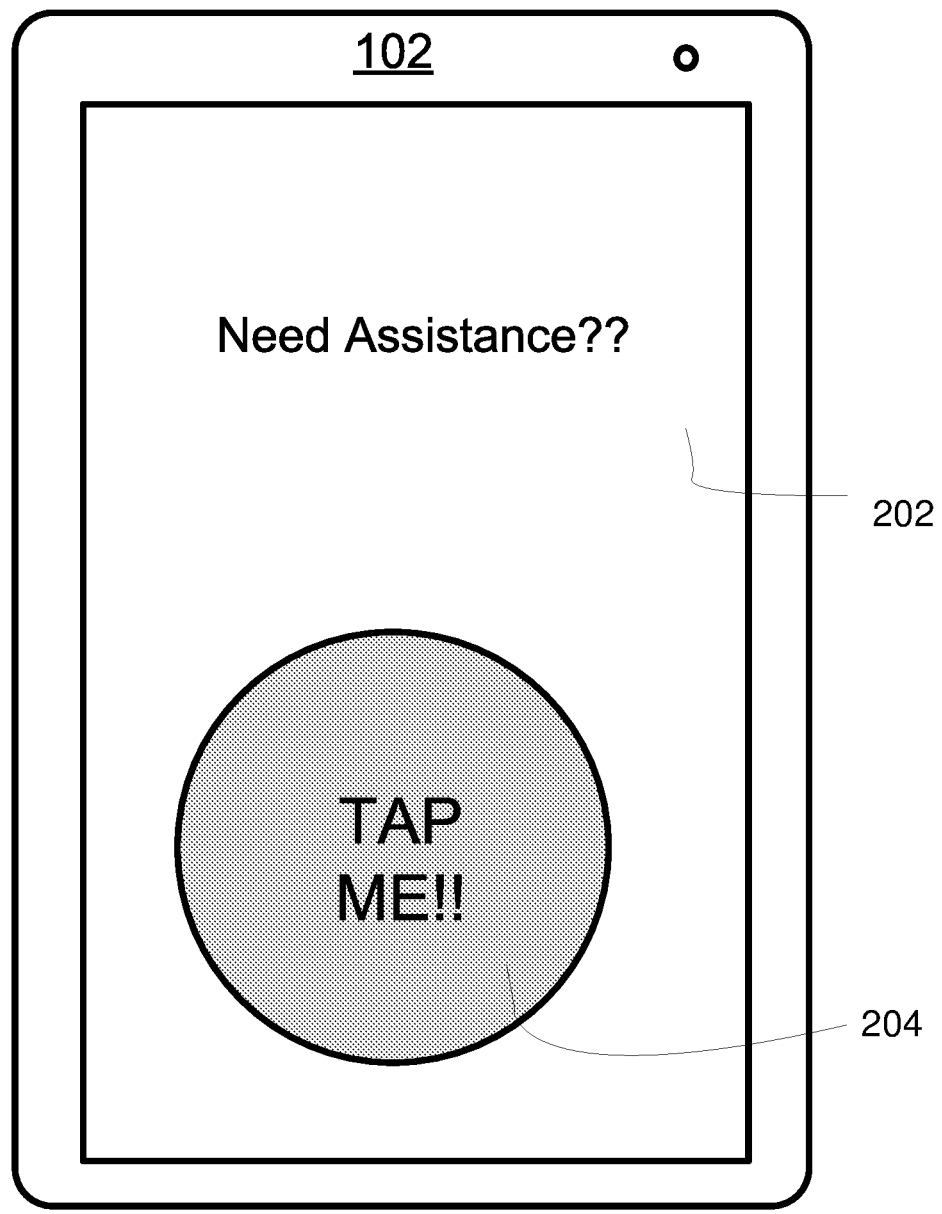
FIG. 2 illustrates a user interface associated with the touchscreen computer.

FIG. 2 illustrates a user interface associated with the touchscreen computer, in accordance with an embodiment. The user interface 202 may be displayed when the touchscreen computer 102 is in an idle state. The user interface 202 may include a background image and activation button 204 as shown in FIG. 2. The touchscreen computer 102 may operate in an idle state when it is not activated. Further, when a consumer 120 wishes to connect to an agent for addressing a query, the consumer 120 may simply tap the activation button 204. Once the consumer activates the button 204, the agent computer 104 receives a notification for activation. The notification may be sent using a subroutine, a Web Real-Time Communication (WebRTC) and an API call. Consequently, agent computer is configured to highlight the uplink video communication channel associated with the touchscreen computer 102 in the screen of the agent observing the uplink video streams from the touchscreen computers 102. Further, the agent computer 104 directs the uplink video stream to an appropriate agent who may provide a suitable solution to the query. In a variation of the embodiment, the touchscreen computer 102 may include a physical button for activating the touchscreen computer 102. The physical button may be hardwired to the touchscreen computer 102.

Figure 3:
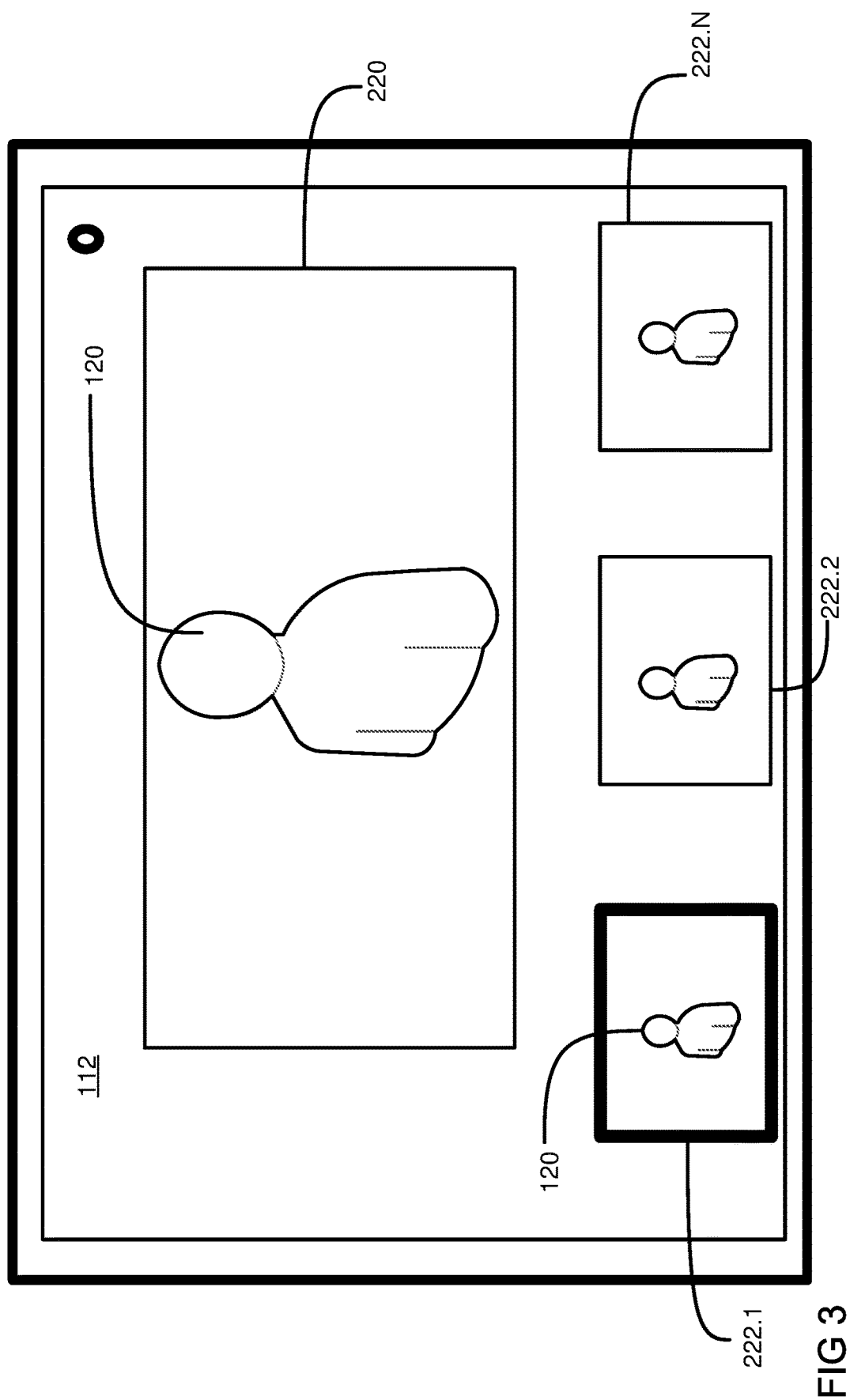
FIG. 3 illustrates a user interface associated with a display unit associated with the agent computer.

FIG. 3 illustrates a user interface associated with a display unit 112 associated with the agent computer 104. The user interface includes a main screen 220 and a multiple sub-screens 222.1-222.N. The agent computer 104 may receive continuous uplink video streams from the touchscreen computers 102.1-102.N and display the received uplink video streams in the sub-screens 222.1-222.N. In an exemplary scenario, a consumer, such as consumer 120, may activate the TAP ME! Button at the touchscreen computer 102. In some cases, the consumer 120 may activate the touchscreen computer 102 using inputs such as gestures, facial expressions, biometric parameters and the like. Thereafter, a graphical indication of the notification of activation from one of the touchscreen computers 102 may be displayed at the screen 112.

Further, the graphical indication may be associated with the video stream received from that touchscreen computer 102 which the consumer 120 activated. In this example, the sub-screen 222.1 is displaying the continuous uplink video stream from touchscreen computer 102. For example, the graphical indication may include a highlighting, a flashing, an animation for indicating that the consumer 120 has activated the touchscreen computer 102. The agent 125 may then select the sub-screen 222.1 for initiating an engagement with the consumer 120. For example, the agent may select the sub-screen 222.1 using at least one means such as, but not limited to, a mouse, a touch input, a gesture input, a biometric input, a trackball input and the like. Thereafter, the agent device 104 may capture a video stream by the camera of the agent computer 104 and establish a video channel with the touchscreen computer 102 to send the captured video stream as a downlink video stream from the agent computer 104 to that selected touchscreen computer 102. In some exemplary embodiments, the cameras associated with the agent computer and the touchscreen computers may be integral thereto. However, in some cases, the cameras may be configured to operate separately from the agent computer and the touchscreen computer. For example, the camera in this case would be a webcam, a digital camera coupled to the agent computer or the touchscreen computer using a USB cable and the like.

The term uplink video stream referred to in this disclosure refers to a video stream which is sent from the touchscreen computers 102 to the agent computer 104. For example, all the touchscreen computers 102.1-102.N are configured to send the uplink video stream continuously to the agent computers 104. It is immaterial if the touchscreen computer 102 is in an idle state or an activated stater. The touchscreen computers 102 are configured to send a continuous stream of uplink video to the agent computers 104. Further, the term downlink video stream refers to a video stream which is streamed from the agent computer 104 to the touchscreen computer 102. The downlink video stream may be generated only when the agent 125 selects the notification of the uplink video stream which is activated by the consumer 120.

Figure 4:
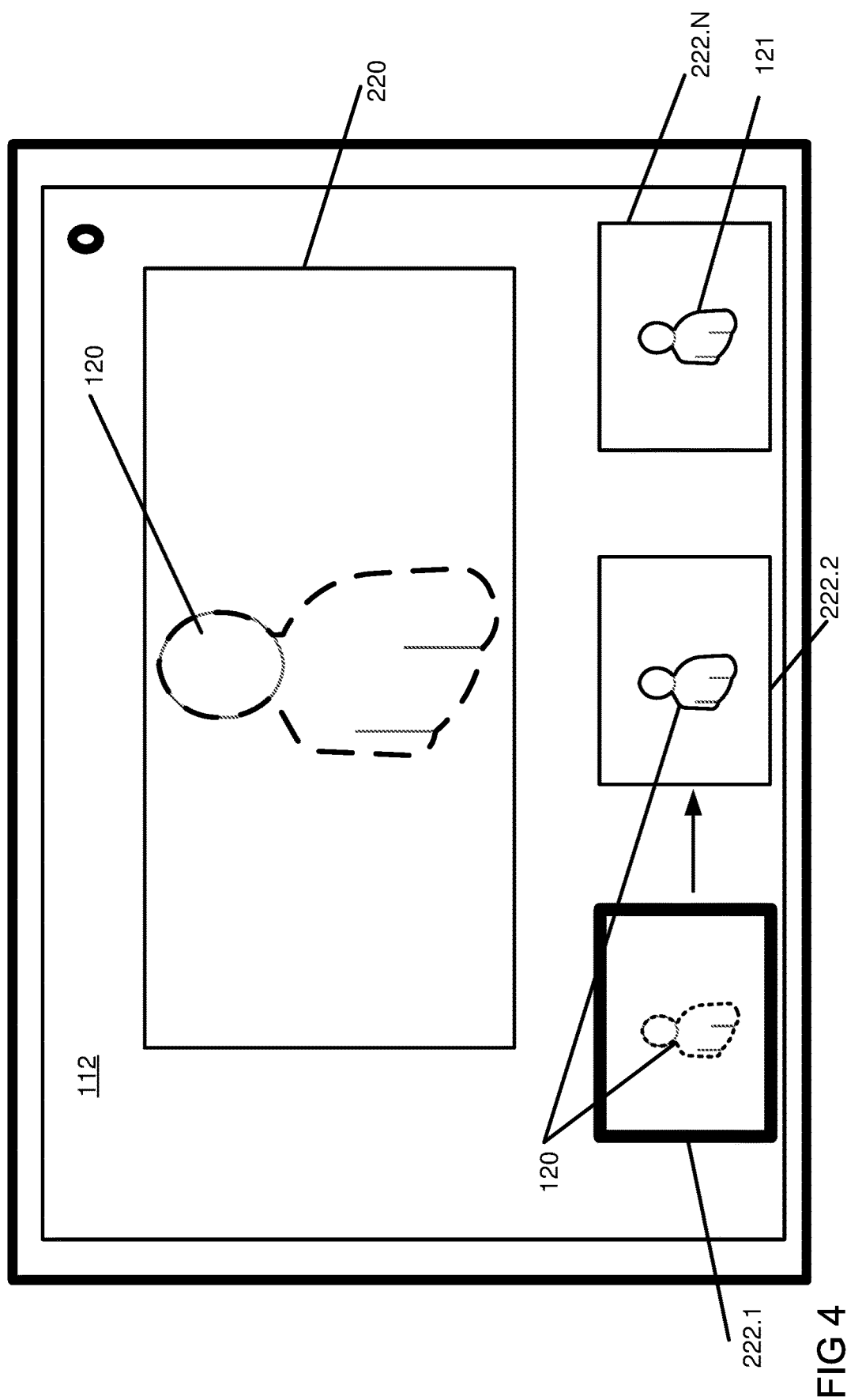
FIG. 4 illustrates a user interface of the agent wherein a consumer moves between two touchscreen computers.

FIG. 4 illustrates an exemplary working of the computer network 300 for facilitating interaction between the consumer 120 and the agent 125, in accordance with an embodiment. The touchscreen computers 102.1-102.N may be deployed in a premises such as a product showroom. Further, the touchscreen computers 102.1-102.N may be in the idle state wherein the touchscreen computers 102.1-102.N are displaying an interface having the TAP ME! button 302. A consumer 120 entering the premises may wish to engage with an agent 125 to resolve an issue. In such a case, the consumer 120 may press the TAP ME! button 302 displayed on the screen of the touchscreen computer 102.1 thereby sending a notification 306 at the screen 112 of the agent. When the user presses the TAP ME! Button on the touchscreen computer 102.1, touch screen generates a signal an interrupt line that is connected to processor via the touchscreen. The activation of the interrupt line causes the processor to register input data from touch screen, such as pixel coordinates of the pixels where the consumer 120 touches the touch screen 412. The touchscreen device may send a notification of the agent computer 104 indicating that a consumer is present at the touchscreen device 102.1. The notification 306 may be generated by highlighting the uplink video stream of the touchscreen computer associated therewith. As shown in FIG. 3, the uplink video stream associated with touchscreen computer 102.1 is highlighted. Thereafter, the agent 125 selects the highlighted uplink video stream which results in a downlink video stream generated from the agent computer 104. The downlink video stream may include the real-time video of the agent 125 who may be able to help the consumer 120 with any query. The touchscreen computer switches from the idle screen to a video display mode to display the downlink video stream received from the agent computer. As a result, the consumer 120 can see the agent 125 on the screen of the touchscreen computer 102 and carry out a conversation.

In an embodiment, the agent computer 104 may receive all the continuous uplink videos from the touchscreen computers 102.1-102.N at the same time. This is useful in cases where the consumer moves between touchscreen computers 102.1-102.N. Agent 125 can see how the consumer 120 disappears from one video stream and appear at a different video stream. FIG. 4 illustrates a screen of the agent wherein a consumer moves between two touchscreen computers. Agent 125 can then proactively select the video stream where the consumer just re-appeared to continue a conversation that was interrupted by the consumer moving away from the first touchscreen computer. In FIG. 4, the consumer 120 has is moving from the touchscreen device 102.1 to 102.2. In such a case, the consumer 120 will disappear from main screen 220 and the sub-screen 222.1. Thereafter, once the consumer 120 moves to a new location where the touchscreen device 102.2 is located, the consumer 120 appears in sub-screen 222.2 in the agent screen 112. As a proactive step, the agent may activate the sub-screen 222.2 to see the consumer 120 again in main screen 220. This allows the agent 125 to advise the consumer 120 to "please walk down the aisle and I will meet you there", for example. The agent screen 112 may be displaying other consumers, such as consumer 121, in other sub-screens such as 222.N.

Figure 5:
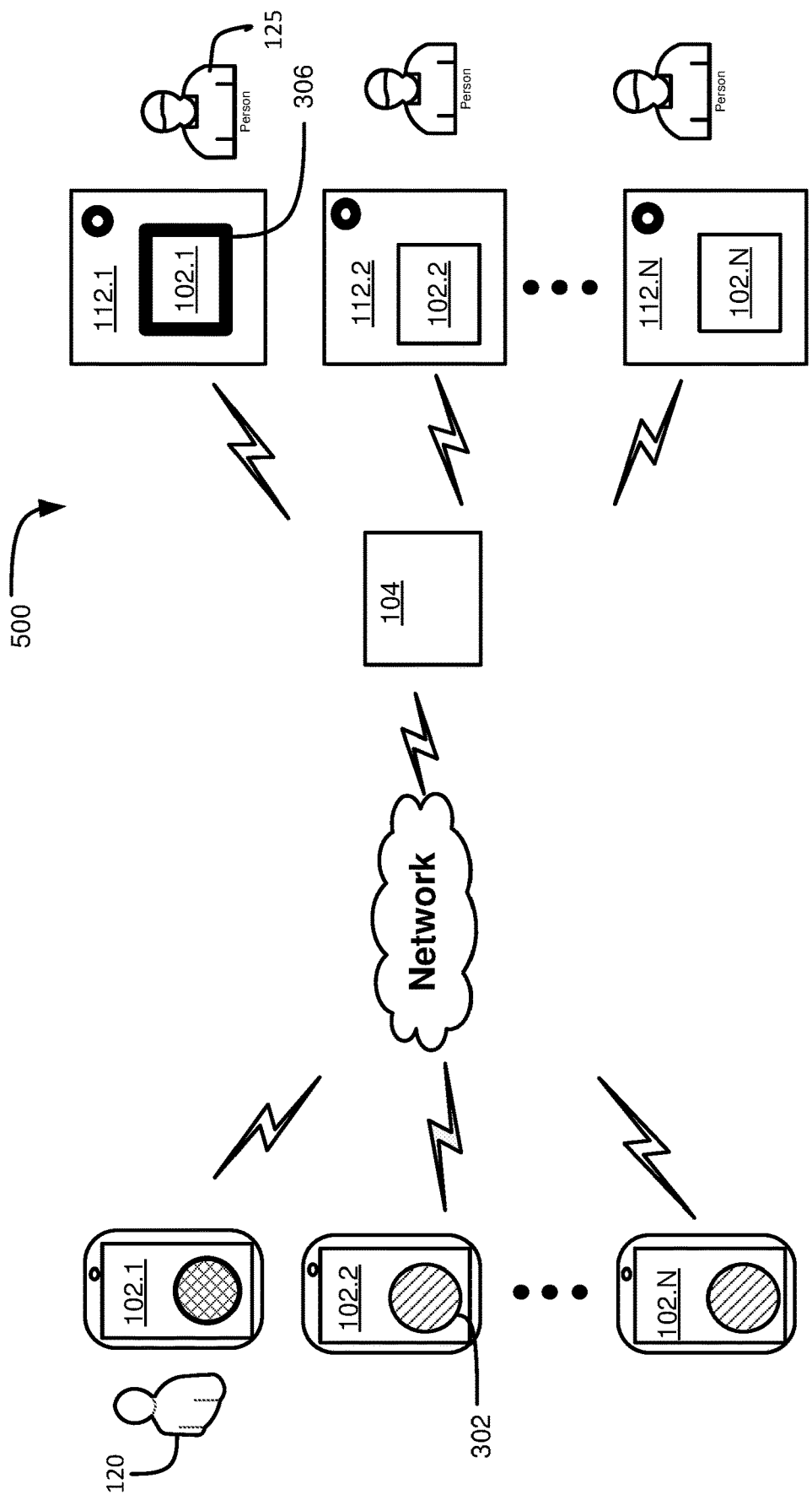
FIG. 5 illustrates an exemplary working of the computer network for facilitating interaction between a consumer and an agent.
Figure 6:
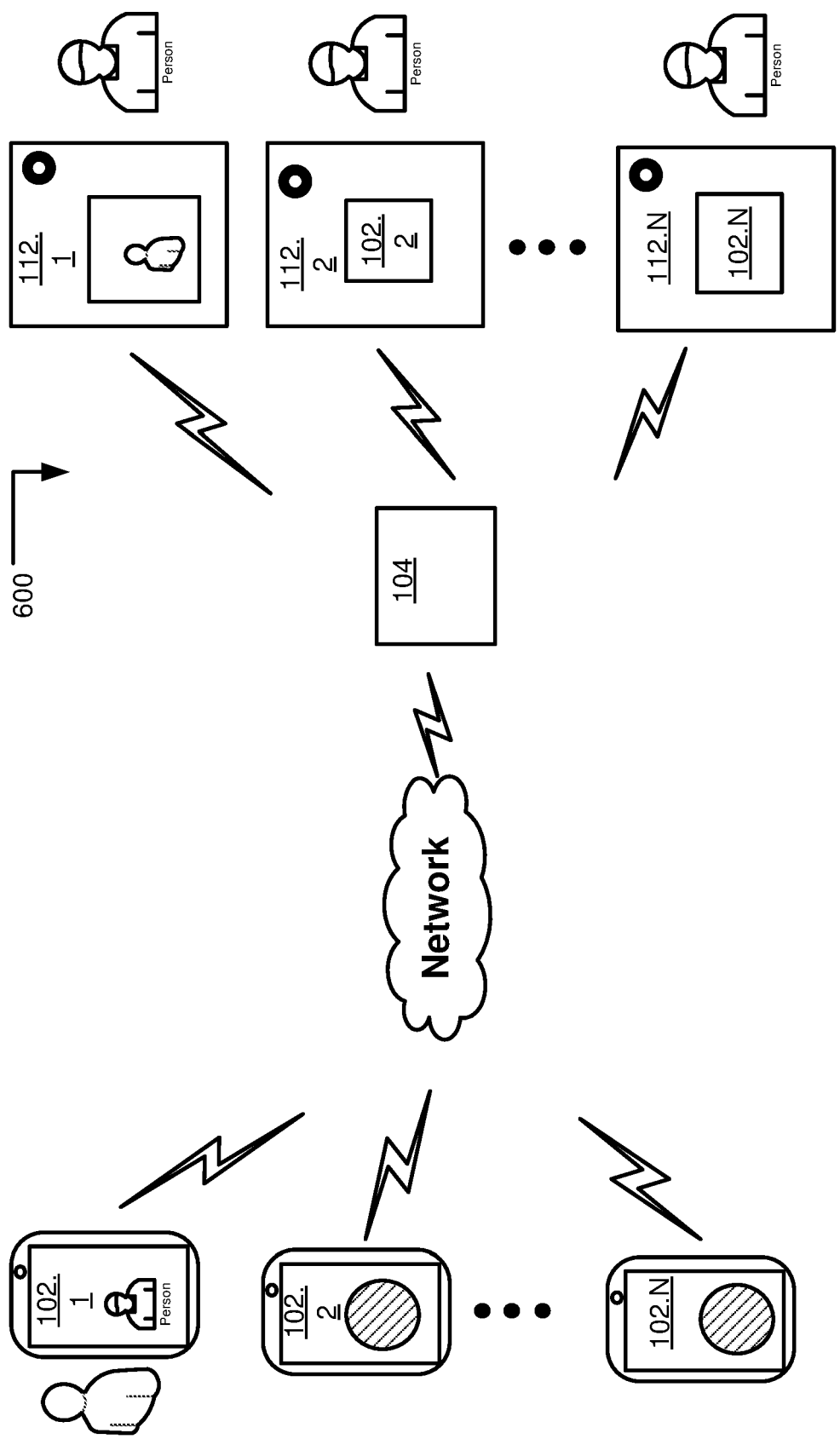
FIG. 6 illustrates another exemplary working of the computer network.

Further, the agent computer 104 may route the continuous uplink video streams from the touchscreen computers 102.1-102.N to appropriate agents based on several factors such as, but not limited to, a location of the agent 125, expertise of the agent 125 and a department from which the query is originating. FIG. 5 illustrates another exemplary working of the computer network, in accordance with an embodiment. As shown in FIG. 6, once the agent 125 selects the highlighted video stream, a downlink video channel is created between the agent computer 104 and the touchscreen computer 102.1. Thereafter, the consumer 120 and the agent 125 may be able to interact with one another through the video communication channels created between the two devices. As illustrated in FIG. 5, the consumer 125 at touchscreen computer 102.1 is able to view agent 125 who is located at agent computer 112.1. Likewise, the agent 125 is able to view and interact with consumer 120. The live streaming of the uplink and downlink streams may be routed via a network. After, the interaction the agent computer 104 may terminate the downlink video stream and continue to receive the uplink video stream.

In some embodiments, the agent computer 104 may use JavaScript Object Notations (JSON) such as, but not limited to, Kurento for streaming the uplink and downlink video streams between the agents 125 and consumers 120. Further, the agent computers 104.1-104.N and touchscreen computers 102.1-102.N may use peer-to-peer (P2P) streaming solutions for creating and manipulating the uplink and the downlink video streams. The P2P streaming solutions may include, but are not limited to, StreamRoot, Alluvium, CDNetworks, PeerCast, Tribler and others. Further, the computer network 100 may include a media server for receiving, processing and transmitting the video channels between the touchscreen computers 102 and the agent computers 104. The media server may host one or more video streaming APIs for performing the said functions. The setup of the computer network with the media server is further elaborated in conjunction with FIG. 6.

Figure 7:
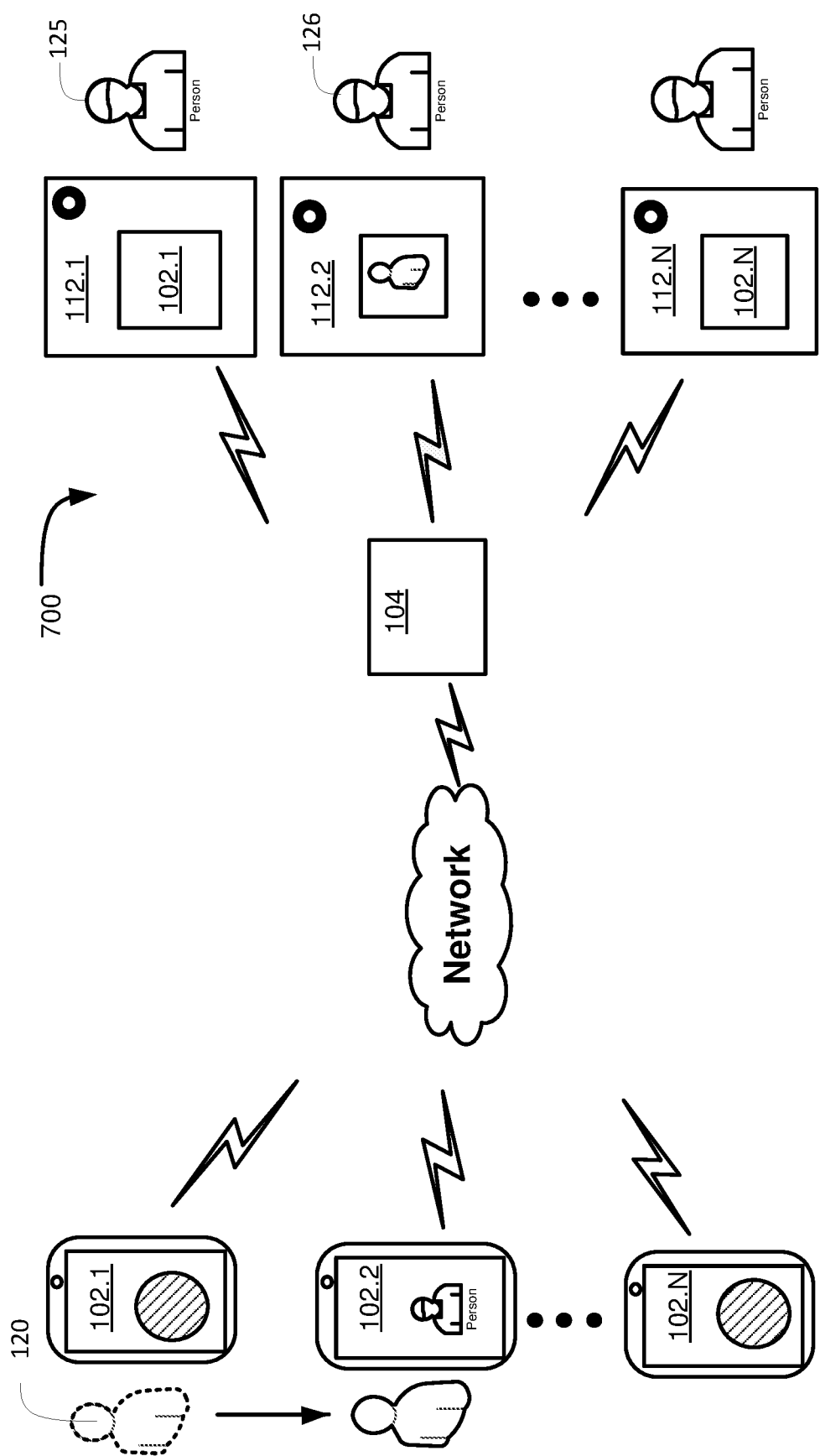
FIG. 7 illustrates an exemplary scenario in the working of the computer network.

FIG. 7 illustrates an exemplary scenario in the working of the computer network 100, in accordance with an embodiment. As explained in FIG. 5, the consumer 120 using the touchscreen computer 102.1 may be engaged with a video session with the agent 125 using the agent screen 112.1. During the course of the video chat, the consumer 120 may choose to move to a new location where a touchscreen computer 102.2 is situated. For example, the consumer 120 may move to another department in a store. Further, the touchscreen computer 102.2 may be transmitting a continuous uplink video to the agent computer 104. The continuous uplink video from the touchscreen computer 102.2 may be displayed to an agent 126 who may be seated at the same location or at a remote location. When the consumer 102 moves away from the touchscreen computer 102.1 the downlink video channel from the agent 125 to the touchscreen computer 102.1 is terminated. In this case, the agent 125 may manually terminate the downlink video channel as the consumer 120 is no longer interacting with agent 125. Further, the agent 126 who may be receiving a continuous uplink video feed from the touchscreen computer 102.2 may observe that the consumer 120 has activated the touchscreen computer 102.2. The agent 126 may observe that the uplink video feed from touchscreen computer 102.2 is highlighted. Thereafter, agent 126 may select the feed from touchscreen computer 102.2 to initiate a downlink video channel from agent computer 112.2 to touchscreen computer 102.2. The consumer 120 and the agent 126 may engage in a conversation after the video channels are established. In some embodiments, the agent computer 104 may use face detection algorithms, motion detection algorithms and other image processing algorithms to detect the movement of the consumer 120.

In some embodiments, consumer 120 may enquire about a service which may be out of scope for agent 125. In such cases, the agent 125 may divert the call to an agent of an appropriate department who may be able to handle the query from the consumer 120. In this case, the agent 125 may divert the call to agent 126 who is working with the agent computer 112.2. In such cases, the consumer 120 may continue using touchscreen computer 102.1 while the call was diverted. Thereafter, the agent 126 may initiate a new downlink video channel from the agent computer 112.2 to the touchscreen computer 102.1. After establishing the downlink channel, the agent 126 may be able to engage with the consumer 120 and may resolve the query. The computer network 100 may be able to connect consumers and agents across disparate locations with one another using the video streaming application installed in the touchscreen computers 102 and agent computers 104.

Figure 8:
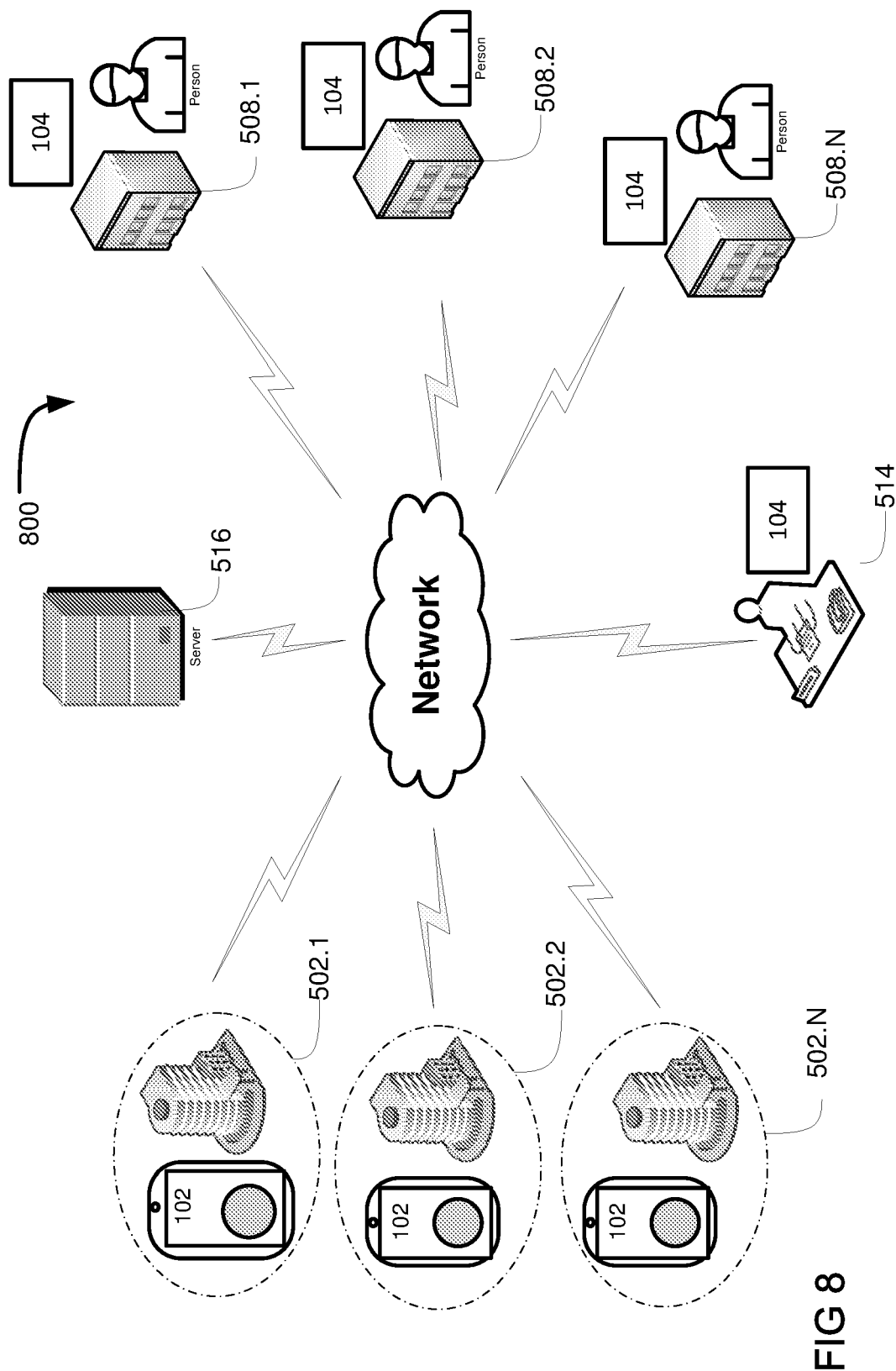
FIG. 8 illustrates an exemplary working environment of the computer network.

FIG. 8 illustrates an exemplary working environment of the computer network 600, in accordance with an embodiment. The environment 600 includes a consumer premises (502.1, 502.2 and 502.N), a network 520, an operator 514, a media server 516 and agent premises (508.1, 508.2 and 508.N). The consumer premises may include, for example, retail shops, showrooms, offices, exhibitions and other places where there is an interaction with consumers. At any point, the consumer premises may be located across different geographical locations and time zones. Further, a plurality of touchscreen computers such as touchscreen computers 102.1 may be deployed across the consumer premises 502. The touchscreen computer 102 may be connected to each other via a network 520. The network 520 may include a wired and/or a wireless network. The touchscreen computers 102 may be connected to multiple networks served by different routers/access points. However, all the touchscreen computers 102.1-102.N may interact with each other and exchange information. Further, the agent premises 508.1-508.N may be the locations where the agents for servicing the queries of the consumers are residing. The agents specializing in specific functions of a company may be located in different premises. The agents may be using agent computers 104 for engaging the consumer and resolving their queries. The agent computers 104 may be configured to receive a continuous uplink video stream from one or more touchscreen computers deployed at the consumer premises 502.

Figure 9:
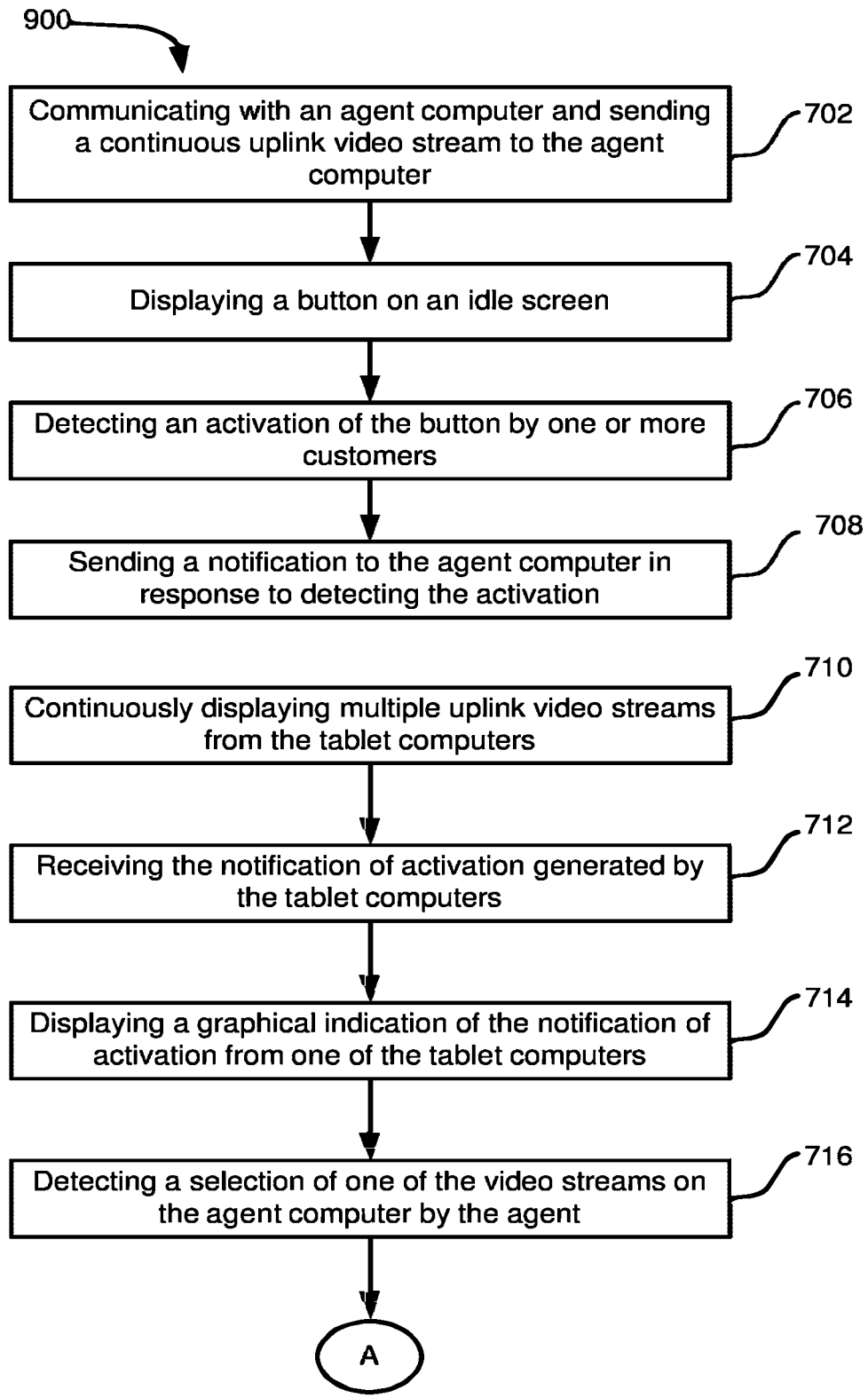
FIG. 9 illustrates a flowchart of exemplary method steps involved in facilitating engagement between consumers and agents using a computer network.
Figure 9:
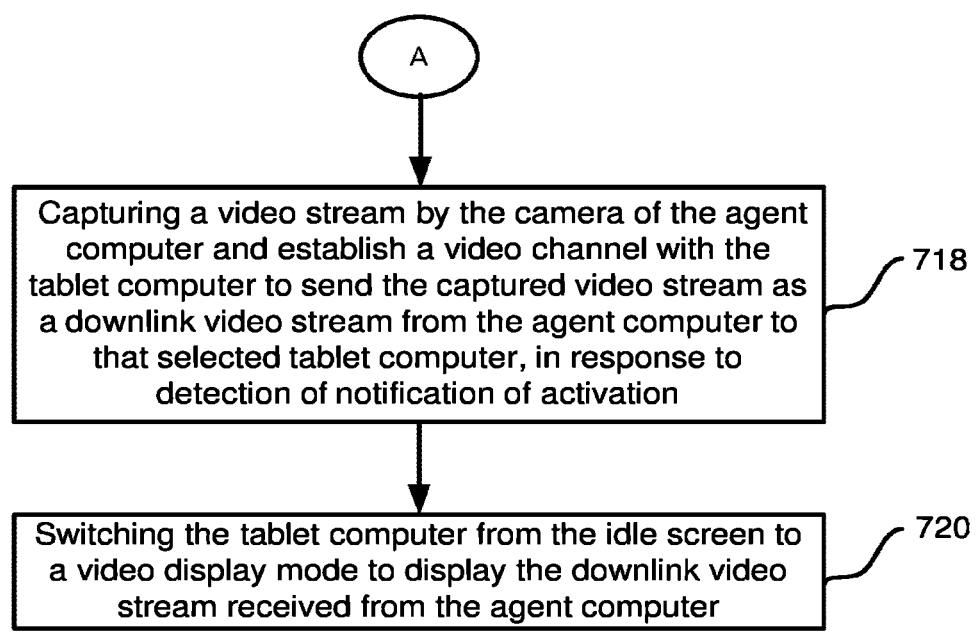

In an embodiment, the media server 516 may host a video streaming application which aids in receiving, diverting and termination uplink and downlink video streams from the touchscreen computer 102 and the agent computers 104. Further, the media server 516 may include a routing table for diverting specific uplink video streams from touchscreen computers 102 to relevant agents. For example, a consumer premises 502 may include multiple showrooms associated with different products of a company. In this case, the media server 516 may include routing table to divert the uplink video streams from touchscreen computer 102 to relevant agents based on the location of the touchscreen computers 102. In an exemplary embodiment, the computing network 600 may include an operator 514 for supervising the operation of the computing network 600. The operator 514 may be involved in facilitating the conversation between the consumers 120 and the agents 125. In an exemplary scenario, the operator 514 may divert the calls from a consumer to a relevant agent. In some other cases, the operator 514 may be involved in handing over a call from one agent to another agent in case there is a necessity. FIG. 9 illustrates a flowchart of exemplary method steps involved in facilitating engagement between consumers and agents using a computer network, in accordance with an embodiment. A step 702, agent computer receives a continuous uplink video stream from one or more touchscreen computers at consumer premises. At step 704, a TAP ME! Button may be displayed on the touchscreen computer. The TAP ME! Button may be activated by a consumer to engage with an agent for query resolution. At step 706, an activation of the button by one or more consumer is detected. At step 708, the touchscreen computer sends a notification to the agent computer is sent in response to the activation of the button on the touchscreen computer by the consumer. At step 710, the agent computer displays multiple uplink videos originating from touchscreen computers. At step 712, the agent computer receives a notification of activation of the touchscreen computer. At step 714, the agent computer generates a graphical indication to highlight the uplink video from which the notification of activation is received. At step 716, the agent computer detects a selection of the video streams. At step 718, the agent computer captures a video stream by the camera of the agent computer and a video channel is established with the touchscreen computer to send the captured video stream as a downlink video stream from the agent computer to that selected touchscreen computer. At step 720, the touchscreen computer switches from the idle screen to a video display mode to display the downlink video stream received from the agent computer It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer network for facilitating engagement between consumers present at a premises and agents, the computer network comprising:
 a plurality of touchscreen computers installed on the premises comprising cameras, wherein the touchscreen computers are configured to:
  communicate with an agent computer and send a continuous uplink video stream to the agent computer;
  display a button on an idle screen;
  detect an activation of the button by one or more consumers;
  in response to detecting the activation of the button, send a notification to the agent computer;
 wherein the agent computer comprising a camera is configured to:
  continuously and simultaneously display multiple uplink video streams from the touchscreen computers;
  receive the notification of activation generated by the touchscreen computers;
  display a graphical indication of the notification of activation from one of the touchscreen computers, the graphical indication being associated with the video stream received from said one of the touchscreen computers;
  detect selection of one of the video streams on the agent computer by the agent,
  in response to detection of the selection, capture a video stream by the camera of the agent computer and establish a video channel with said one of the touchscreen computers to send the captured video stream as a downlink video stream from the agent computer to said one of the touchscreen computers;
 wherein said one of the touchscreen computers is configured to switch from the idle screen to a video display mode to display the downlink video stream received from the agent computer; and
 wherein the agent computer is further configured to:
  detect selection of a further one of the video streams on the agent computer by the agent,
  in response to detection of the selection, terminate the video channel and establish a further video channel with said further one of the touchscreen computers to send the captured video stream as a downlink video stream from the agent computer to said further one of the touchscreen computers; and
 wherein the touchscreen computer is configured to switch from the video display mode to the idle screen and the further touchscreen computer is configured switch from the idle screen to a video display mode to display the downlink video stream received from the agent computer.

2. The computer network of claim 1, wherein multiple agents are associated with multiple agent computers and each video uplink from the touchscreen computers devices is directed to one of the multiple agent computers.

3. The computer network of claim 1, wherein the uplink video stream from a touchscreen computer is directed to the agent computer based on a proximity of the touchscreen computer to the agent computer.

4. The computer network of claim 1, wherein the computer network is installed at a premises having multiple departments and wherein the network is configured to stream continuous uplink video streams from the touchscreen computers of a department to an agent computer of said department.

5. The computer network of claim 1, wherein the agent computer is configured to detect a movement of the consumer from one touchscreen computer to another touchscreen computer and accordingly terminates a current downlink stream and starts a new downlink stream to the touchscreen computer to which the consumer has moved.

6. The computer network of claim 5, wherein the agent computer is configured to detect the movement of the consumer from one touchscreen computer to another by at least one of, analysing the continuous uplink data streams from the touchscreen computers, using at least one face detection algorithms and using at least one motion detection algorithm.

7. The computer network of claim 1, wherein the agent computer is configured to use at least one face detection algorithm to notify the agent that the face of the consumer which was appearing in the uplink stream of the touchscreen computer has appeared in the uplink video stream of another touchscreen computer;
   the agent computer further redirects the downlink video stream to the other touchscreen computer to which the consumer has moved.

8. The computer network of claim 1, wherein the agent computer is further configured to:
   route the uplink video channels to at least one remote device, based on at least one of a location of the consumer interaction device, type of the consumer interaction device and Media Access Control MAC address of the consumer interaction device.

9. The computer network of claim 1, wherein the agent computer is configured to host a database for routing the uplink video channel to at least one remote device, based on at least one of a location of said one of the touchscreen computers, type of said one of the touchscreen computers said one of and MAC address of said one of the touchscreen computers.

10. The computer network of claim 1, wherein the agent computer is configured to terminate the downlink video channels based on a termination input received at the touchscreen computers.

11. The computer network of claim 10, wherein the agent computer continues to receive the continuous uplink video from the touchscreen computers after the termination of the downlink video channel.

12. The computer network of claim 1, wherein the server, the touchscreen computers and the agent computer are configured to communicate with one another using a wireless communication channel.

13. The computer network of claim 1, wherein the touchscreen computers and the agent computer share at least one of a Wi-Fi network, a hotspot and a subnet for communicating with each other.

14. The computer network of claim 1, wherein the computer network comprises a Wi-Fi router configured to host routing tables to route the continuous uplink video streams from the touchscreen computers to one or more agent computers across a premises.

15. A method for facilitating engagement between consumers and agents, the method comprising:
   sending a continuous uplink video stream from a plurality of touchscreen computers to one or more agent computers;
   displaying a button on an idle screen of one of the plurality of the touchscreen computers;
   continuously display multiple uplink video streams from the touchscreen computers at the agent computers;
   detecting an activation of the button displayed on the one of the plurality of touchscreen computers by a consumer;
   sending a notification to the agent computer that a the button on the touchscreen computer is activated by the consumer;
   receiving the notification of activation generated by the one of the plurality of touchscreen computers;
   displaying an indication of the notification of activation from the one of the plurality of touchscreen computers associated with the video stream received from that touchscreen computer;
   detecting selection of one of the video streams on the agent computer by the agent;
   capturing a video stream and establishing a video channel with the one of the plurality of touchscreen computers, in response to detection of notification of activation, and sending the captured video stream as a downlink video stream from the agent computer to the one of the plurality of touchscreen computers;
   displaying the downlink video stream at the one of the plurality of touchscreen computers by changing the mode of the one of the plurality of touchscreen computers from idle to active;
   detecting selection of a further one of the video streams on the agent computer by the agent,
   in response to detection of the selection, terminating the video channel and establishing a further video channel with a further touchscreen computer to send the captured video stream as a downlink video stream from the agent computer to that further touchscreen computer;
   switching the one of the plurality of touchscreen computers from the video display mode to the idle screen;
   switching the further touchscreen computer from the idle screen to the video display mode to display the downlink video stream received from the agent computer.

16. The method of claim 15, wherein the step of sending continuous stream of uplink video streams further comprises:
   streaming the uplink video from the touchscreen computer to the agent computer based on a proximity of the touchscreen computer to the agent computer;
   streaming the uplink video from the touchscreen computer to the agent computer based on at least one of a location of the consumer interaction device, type of the consumer interaction device and MAC address of the consumer interaction device.

17. The method of claim 15, wherein the step of sending the captured video stream as the downlink video stream from the agent computer to that selected touchscreen computer further comprises:
   detecting a movement of the consumer from one touchscreen computer to another touchscreen computer and accordingly terminating a current downlink stream and starting a new downlink stream to the touchscreen computer to which the consumer has selected.

18. The method of any one of claim 17, wherein the step of detecting a movement of the consumer from the one touchscreen computer to the another touchscreen computer comprises at least one of: analysing the continuous uplink data streams from the touchscreen computers, using face detection algorithms and using a motion detection algorithm.

19. An agent computer for facilitating engagement between consumers and agents, the agent computer comprising:
   a camera;
   a processor,
   a memory coupled with the processor, wherein the memory comprises processor executable instructions for:
      continuously displaying multiple uplink video streams from the touchscreen computers;
      receiving the notification of activation generated by the touchscreen computers;

displaying a graphical indication of the notification of activation from one of the touchscreen computers, the graphical indication being associated with the video stream received from that touchscreen computer;

detecting selection of one of the video streams on the agent computer by the agent;

in response to detection of notification of activation, capturing a video stream by the camera of the agent computer and establishing a video channel with the touchscreen computer to send the captured video stream as a downlink video stream from the agent computer to that selected touchscreen computer;

detecting selection of a further one of the video streams on the agent computer by the agent, in response to detection of the selection, terminate the video channel and establish a further video channel with a further touchscreen computer to send the captured video stream as a downlink video stream from the agent computer to that further touchscreen computer;

switching the touch screen computer from the video display mode to the idle screen; and switching the further touchscreen computer from the idle screen to the video display mode to display the downlink video stream received from the agent computer.

* * * * *